United States Patent [19]

Graham, III et al.

[11] 3,742,451

[45] June 26, 1973

[54] CREDIT SALES SYSTEM

[75] Inventors: W. Waverly Graham, III; John M. Jamieson, both of Atlanta, Ga.

[73] Assignee: Valcometric Corporation, New York, N.Y.

[22] Filed: Apr. 13, 1971

[21] Appl. No.: 133,533

[52] U.S. Cl. ............ 340/149 A, 179/1 SB, 340/148
[51] Int. Cl. ....... H01m 1/00, H04q 9/00, G11b 5/00
[58] Field of Search ................ 340/149, 149 A, 152; 179/2 CA, 1 VC, 100.1 VC, 100.2 Z, 1 SB

[56] References Cited
UNITED STATES PATENTS

| | | | |
|---|---|---|---|
| 3,601,805 | 8/1971 | Snook | 340/149 A |
| 3,513,298 | 5/1970 | Riddle et al. | 340/149 A X |
| 3,559,175 | 1/1971 | Pomeroy | 340/152 |
| 3,571,799 | 3/1971 | Coker, Jr. | 340/152 |
| 3,594,727 | 7/1971 | Braun | 340/152 |

*Primary Examiner*—Donald J. Yusko
*Attorney*—Cushman, Darby & Cushman

[57] ABSTRACT

A credit method and system including a plurality of individual, separated credit stations each provided with a magnetic tape having credit information, such as the numbers of invalid cards. A central station periodically, for instance once each night, transmits, preferably by frequency modulated radio waves, updating credit information to the credit stations, which replace the information on their tape with the updating information. To check a card, it is first presented to a credit station where credit information coded in or on the card in magnetic ink or otherwise is compared with information on the tape. In addition, a voice pattern on the card can be compared with the voice pattern of the person presenting the card at the station as derived from his enunciation of a code word or phrase. If the card is accepted, the transaction is preferably manually entered into and displayed at the credit station before being stored, preferably at a plurality of locations, on another magnetic tape.

19 Claims, 6 Drawing Figures

INVENTORS
W. WAVERLY GRAHAM, III.
JOHN M. JAMIESON

BY Cushman, Darby & Cushman
ATTORNEYS

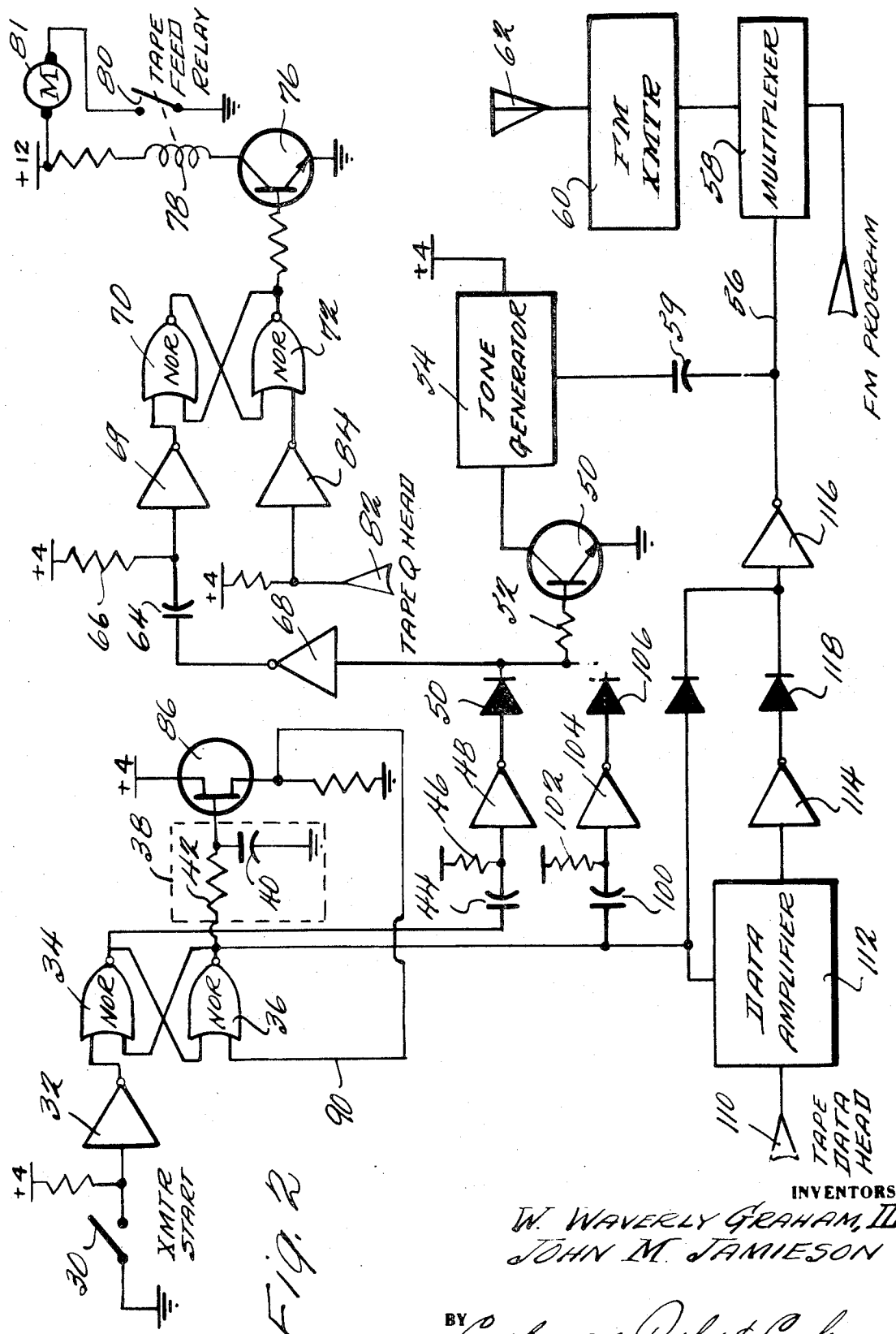

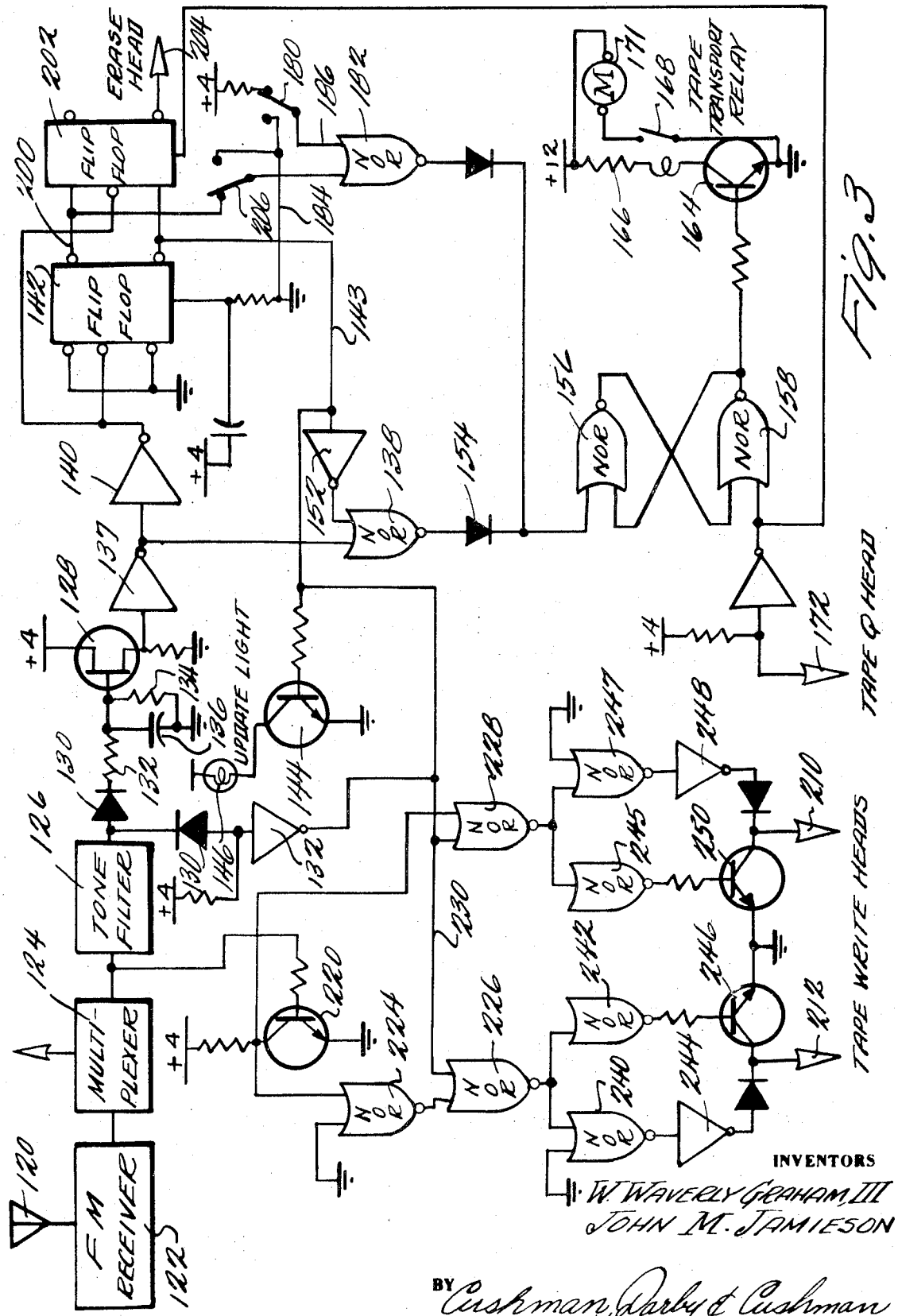

CREDIT SALES SYSTEM

BRIEF DESCRIPTION OF THE PRIOR ART AND SUMMARY OF THE INVENTION

The invention relates to a credit method and system.

The use of credit in modern society has become the backbone of most consumer transactions and at the same time misuse of credit has become one of the major financial problems. Most credit systems issue identifying cards which have information printed on them or coded in them identifying the credit card holder and providing other pertinent information such as credit limits and the data of expiration. This card must be presented at the time credit is extended and provides an element of security against credit misuse by the rightful holder of the card or improper use by anyone else.

One approach now employed widely for preventing extension of credit to those individuals who have misused their cards or to individuals holding cards which have been reported lost or stolen is by checking the card identification number of each card presented against a printed list of card numbers of lost, stolen or misused cards before completing the transaction. While this approach may be practical in credit systems which have only a few thousand credit cards outstanding, and hence at most a few hundred numbers to check, it becomes a time-consuming and inefficient process in credit systems which have several million credit cards outstanding with potentially several thousand credit numbers on the printed list at any given time. The lengthy interval required to check the list is irritating to the customer and requires time of retail personnel which could be better spent otherwise. Further, issuing the list at frequent intervals may be a problem since some time is required to compile, print and distribute each list to all stations at which credit may be extended; thus each list is inevitably out of date shortly after it is issued and credit cards which are determined to be lost, stolen or misused and then used in the intervals between the times the list are distributed are not detected by the system. As an alternative to printed lists, credit information stored on other media such as upon magnetic tapes, holographic grids, etc. can be periodically distributed to individual credit stations for use in special devices which convert the information on such media into a form in which it can be compared with credit information presented orally or on an individual credit card at a credit station.

One alternative to this approach which has been used in large credit systems is an on-line connection between each of the credit stations and a master station including a computer which maintains an up-to-the-minute compilation of the status of all credit card numbers and any other information desired. Thus, to check a presented credit card, the identification number of the credit card and/or other credit information is transmitted to the central station. The central station then checks the status of the account represented by that number and transmits information back to the individual credit station as to whether to approve or disapprove the credit transaction. The major drawback to this approach is the large expense of maintaining on-line communication and keeping the computer at the central station available at all times for responding to credit queries. While this system is capable of responding with extreme speed to changes in the status of credit accounts, the expense for most credit system is too large to be practical. One modification of this approach which has been employed is for each credit station to telephone or otherwise communicate only some of the credit numbers or other information to the central facility for checking. Ordinarily, only those credit transactions which the individual at the credit station believes suspicious or which are large in amount are checked, again because of the considerable expense of communication with the central station and use of the central station for checking the status of each individual credit transaction.

A further problem inherent in a system employing credit cards is that cards that are lost or stolen are normally employed by the finder or thief immediately thereafter so that even with an on-line system, the finder or thief has an opportunity to use the card several times before the owner thereof discovers his loss, or has an opportunity to communicate that information to the central station. Several approaches have been suggested in the past for eliminating this problem, and these approaches include incorporation of a secret coded number into the credit card, for example, by magnetic ink within the interior of the cards, metal plates, etc., which can be mechanically or electronically detected and decoded. To obtain credit the holder of the card must orally recite that same secret number at the credit station. Since the thief or finder of a card would normally not have such information, he would not be extended credit by the system.

The present invention relates to a credit system and apparatus wherein, in the embodiment discussed below, a plurality of separated credit stations, for example, at department stores, gas stations, etc. are each provided with a magnetic tape having thereon credit information, such as the numbers of invalid credit cards. This information is periodically up-dated, for example, once each night, by the transmission of radio wave signals from a central facility, at which information is gathered, to each of the credit stations. The central facility may include a commercial radio station, preferably a frequency modulated station, and the credit card information transmitted on an unused subcarrier which will not interfere with normal FM programming. Updating information on a magnetic tape at the central station is preferably converted into information on frequency modulated radio waves and transmitted to the credit stations which each respond to the signals by erasing the information on the magnetic tape at that station containing the credit information and replacing that information with the updating information.

To transmit information to the credit stations, a manual switch at the central station is preferably first operated in order to generate a short coded tone which is transmitted by radio waves to the credit stations to indicate the eminence of credit information transmission. Operation of the manual switch also generates a signal which is transmitted at the central station through a logic network, which includes a delay circuit such that, after a given time following transmission of the first short tone, the logic network shifts back to its initial condition, producing a signal which causes a second tone to be transmitted to the apparatus indicating that the transmission of credit information follows. The production of the first tone also causes the apparatus at the central facility to cause the tape on which credit information is stored to be advanced until an indication on the tape is detected at which time movement of the tape ceases. Upon production of the second signal, the tape again moves forward so that the information on the tape is detected, converted into frequency modulated radio waves and transmitted to each of the credit stations. Upon detection of a further indication on the tape that all of the information on the tape has been transmitted, the tape is automatically stopped and the system is again ready for the transmission of credit information.

At each of the credit stations, the reception of the first tone causes a light or other indicator to be actuated to indicate to individuals at the station that the magnetic tape containing information on credit transactions is to be loaded into the device. The reception of the second tone causes the tape to begin advancing and the updating information transmitted from the central station and received at each of the individual credit stations to be converted into suitable signals and written onto the magnetic tape in place of the credit information thereon. The apparatus at each of the stations preferably includes an arrangement for preventing the writing of the two tones onto the magnetic tape and an erase head is also preferably provided for removing the previous credit information.

According to a further aspect of the invention, each credit station includes an apparatus for deriving a signal from a presented credit card indicating the identification number of that credit. Such identification number may be coded into the card in magnetic ink or the like. The signal derived from the card is compared with the credit identification numbers on the magnetic tape and an indication displayed whether the card is determined to be valid or not. As a further check, the credit card preferably also includes a coded voice pattern of the proper card holder which is converted into appropriate signals by the apparatus. The individual presenting the card pronounces the code, word or phrase and this phrase is converted into a further voice pattern signal and compared with the signal derived from the voice pattern on the card. If the two signals match within pre-set limits, then the presenter of the card is deemed to be the proper holder thereof.

After the card has been determined to be valid and to have been presented by the holder thereof, the transaction is entered into the apparatus by manual operation of keys or by any suitable means. The transaction, for example, the price, is then displayed and, if correct, is written into a further magnetic tape preferably at a plurality of locations on the tape. This tape can then be removed when full and employed as the primary record of credit transactions.

Many other objects and purposes of the invention will become clear from the following detailed description of the drawings.

BRIEF DESCRIPTION OF THE DRAWINGS

FIG. 2 shows a schematic view of a suitable station of FIG. 1;

FIG. 3 shows a schematic view of a suitable credit station of FIG. 1;

DETAILED DESCRIPTION OF THE DRAWINGS

Figure 1:
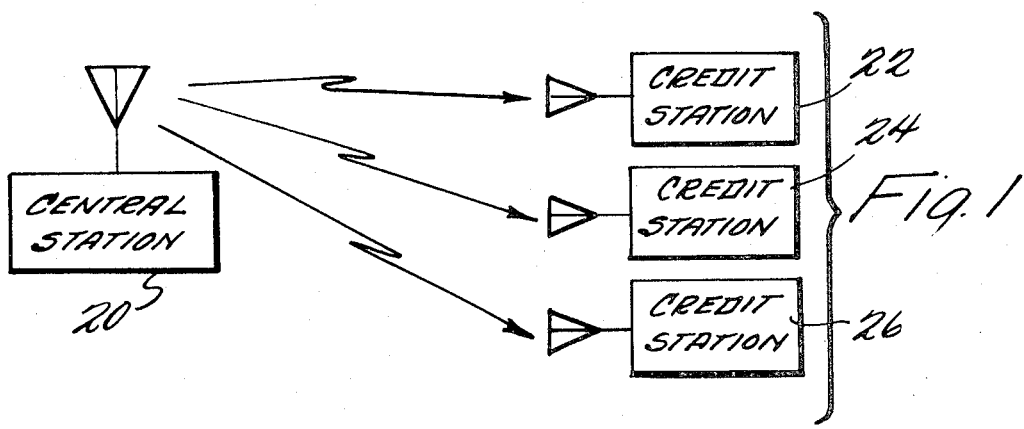
FIG. 1 shows a schematic view of a credit card system according to this invention wherein a central station provides updating credit information by radio waves to a plurality of separated credit stations.

Reference is now made to FIG. 1 which shows a schematic view of the novel credit system of this application. While credit information can be communicated to separated credit stations by physical delivery of printed lists, magnetic tapes having information thereon or other storage media as mentioned above, one particularly advantageous way to effect such communications has been found to be through the use of radio waves. In the arrangement of FIG. 1, the central station 20 periodically transmits credit information coded on radio waves to a plurality of individual, separated stations indicated as 22, 24, and 26.

By using radio waves to transmit credit information the information at each credit station can be up-dated at frequent intervals, for example, once each night, practically and efficiently so that each station is kept as current as possible and losses through extension of credit to individuals having cards with numbers known to be lost or stolen, or cards being improperly used, but not yet reported to the individual credit stations, is minimized. Even further, by using radio waves a commercial radio station, particularly an FM radio station already in existence, can be employed with minimum modifications for up-dating without interfering in any way with the normal operation of the FM station and with the credit numbers or other information multiplexed on the FM carrier in the same manner as the normal programs carried by the stations. Alternately, as discussed above, up-dating magnetic tapes by telephone lines can be employed for communicating new credit information to outlying stations. Since the system described below is substantially automatic in operation, it requires only an individual at the FM station to initiate transmission and the apparatus at each of the individual credit stations can up-date the information automatically without the necessity of monitoring or even the presence of anyone at the individual credit stations.

Reference is now made to FIG. 2 which shows a schematic view of a suitable circuit which can be employed at a conventional FM station for periodically transmitting credit information, multiplexed onto the FM carrier, to outlying credit stations. In this arrangement, the transmission of information is initiated by manual operation of switch 30 which changes the input to inverter 32 from plus four volts or another suitable positive voltage, which is hereafter for the purpose of explanation referred to as a logical one, to ground, which is hereafter for the purposes of explanation referred to as a logic zero. Thus, closing the switch applies a logical zero to inverter 32, in turn applying a logical one to one of the two inputs to NOR gate 34. At this time, the other input to NOR gate 34 is from the output of NOR gate 36 and is a logical zero, as will be apparent from further discussion.

Thus, application of a logic one to the input to gate 34 connected to the output of inverter 32 causes the output of gate 34 to shift from a logical one to a logical zero condition. This shift changes the input to gate 36 connected to the output of gate 34 so that both of the inputs to gate 36 are now logical zeros so that the output of gate 36 shifts from a logical zero to a logical one. This in turn causes the other input to gate 34 which is connected to the output of gate 36 to shift from a logical zero to a logical one, so that after the switch 30 is released and the input to gate 34 from inverter 32 shifts back to a logical zero, the output of gate 34 remains at a logical one until the output of gate 36 returns to its zero state. The shifting of gate 36 from its logical zero to its logical one condition applies a plus four volt or other suitable voltage to the integrating circuit 38 which is conventionally comprised of a capacitor 40 and a resistor 42.

Further, the shifting of the output of gate 34 from its logical one to its logical zero condition produces a pulse which is applied via a differentiating circuit comprised of capacitor 44 and resistor 46 to the base of a transistor 50, also via inverter 48, diode 50 and resistor 52. This pulse causes transistor 50 to shift its condition momentarily from non-conductive to conductive, thus applying a pulse to conventional tone generator 54 which responds by producing a tone which is applied to line 56 via capacitor 59. After the pulse produced by the differentiating circuit comprised of capacitor 44 and resistor 46 ends, transistor 50 returns to its initial state thus causing tone generator 54 to terminate the short pulse tone which it has produced. Preferably this pulse is of the order of 50 milliseconds in duration. This tone applied to line 56 is applied to conventional multiplexer 58 via capacitor 55 which in turn applies a suitable signal to the FM transmitter 60 to produce a signal which is transmitted via antenna 62 to each of the credit stations which receive and employ the one as discussed below.

At the same time, the pulse produced by the differentiating circuit comprised of capacitor 44 and resistor 46 is applied via inverter 68 to a further differentiating circuit comprised of capacitor 64 and resistor 66. The pulse produced by the differentiating circuit comprised of capacitor 64 and resistor 66 is inverted by inverter 69 and applied as one input to a further NOR gate 70. The output of gate 70 is shifted by the pulse thus produced from a logical zero to a logical one condition, thus shifting the output of gate 70 from a logical one to a logical zero. Both inputs to NOR gate 72 are now logical zeros, so that the output of gate 72 shifts to a logical one thus rendering transistor 76 conductive and completing a current path through relay coils 78 which closes switch 80, providing a current path through tape motor 81 which advances the transaction tape. The output of gate 72 is also applied as the other input to gate 70 so that gate 70 remains in its logical zero output condition even after the pulse produced by the differentiating circuit comprised of capacitor 64 and resistor 66 terminates.

The tape advances until a head 82, which is disposed adjacent the tape and which may be disposed for picking up signals on a certain track of the tape, detects a Q mark on the tape indicating the location where credit information is to be entered. This signal is applied via inverter 84 as one of the two inputs to gate 72 and when the Q mark is encountered, a logical one is applied to this input so that gate 72 returns to its zero output condition. When gate 72 returns to its zero output condition, both inputs to logic gate 70 are logically zero, so that the output of gate 70 returns to its one output condition, thus keeping the output of gate 72 in its zero condition and transistor 76 non-conducting so that the tape stops moving.

After the capacitor 40 of integrating circuit 38 charges to a sufficient value, transistor 86 becomes conductive, thus changing the output on line 90 from ground to plus 4 volts, i.e., from logical zero to logical one. The application of a logical one input on line 90 to an input to gate 36 shifts the output condition of that gate from a logical one to logical zero. This shift causes a further pulse to be applied to transistor 50 via a second differentiating circuit comprised of capacitor 100 and resistor 102 and via inverter 104, diode 106 and resistor 52. Transistor 50 is again momentarily rendered conductive, thus causing tone generator 54 to produce a second tone similar to the first, preferably of a duration of approximately 50 milliseconds, which is applied to line 56 via capacitor 59 to cause the multiplexer 58 and frequency modulating transmitter 60 to transmit the tone signal via antenna 62 to each of the individual credit stations.

The pulse produced by the differentiating circuit comprised of capacitor 100 and resistor 102 is also applied to the input of gate 70 via inverter 68, the differentiating circuit comprised of capacitor 64 and resistor 66 and inverter 69. Again, the application of a logical one as one of the inputs to gate 70 causes the output of that gate to shift to a logical zero which in turn causes the output of gate 72 to shift to a logical one, thus rendering transistor 76 conductive and completing a current path through relay coil 78 to cause the tape to resume its advance.

A head 110 is disposed adjacent the advancing tape and produces signals which are converted into a suitable form by data amplifier 112 and applied to line 56 via inverting amplifiers 114 and 116 as well as diode 118. These signals are converted by multiplexer 58 and transmitted by transmitter 60 via antenna 62 to the credit stations. At the end of the information to be transmitted on the tape, a further Q mark is encountered be head 82, which applies a logical one signal to one of the inputs to gage 72 which causes the output of that gate to shift to a logical zero to render transistor 76 non-conductive and to terminate the current path through relay coil 78 so that the tape stops, ready for further transmission of information upon further manual operation of switch 30.

Reference is now made to FIG. 3 which shows a schematic view of one credit station for receiving the signals produced by the central facility 20 as discussed above. Frequency modulated signals are received by antenna 120 and passed to a conventional FM receiver 122 and multiplexer 124. A tone filter 126 detects the tones produced by tone generator 54 and passes these tones only to a uni-junction transistor 128 via diode 130 and a circuit comprised of resistor 132, resistor 134 and capacitor 136 which serves to integrate the signal. If the signal persists for the time duration of the signals produced by tone generator 54, for example, 50 milliseconds, transistor 128 is rendered conductive to produce a logical one signal which is inverted by inverter 137 and applied as one of the two inputs to a conventional NOR gate 138.

This pulse is further inverted by inverter 140 and also applied to a conventional flip-flop 142 which changes its logical output and applies on line 143 a signal to transistor 144 which renders that transistor conductive and completes a current path through light 146 which indicates at the station that the transmission of credit information is imminent, and that if the transaction tape is not inserted at the proper location for erasing the credit information, it should be immediately inserted at that location. If desired, a buzzer or other warning may also be employed for indicating the imminence of credit transmission. The output of flip-flop 142 on line 143 is also applied via inverter 152 as one of the two inputs to NOR gate 138 so that when flip-flop 142 shifts its condition in response to an applied pulse from inverter 140, both inputs to NOR gate 138 are logic zeros, thus producing a logical one output which is applied via diode 154 to a further NOR gate 156. The output of NOR gate 156 is applied to one of two inputs to yet another NOR gate 158 and similarly the output of gate 158 is applied as the other input to gate 156. The shifting of the output of gate 138 from its zero to its logical one condition applies a logical one to one of the two inputs to gate 156 which in turn causes the output of that gate to shift from a logical one to a logical zero. This shift in turn causes gate 158 to shift from a logical zero to a logical one output since both of its inputs are now logically zero. This shift renders the transistor 164 conductive, thus completing a current path through coil 166 which closes switch 168 which causes motor 171 to advance the tape loaded in the updating apparatus until head 169 detects the Q mark and applies a logical one input to gate 158 via inverter 170. At this time the output of gate 158 shifts back to its logical zero output condition and output of gate 156 shifts back to its logical one output condition and the device is ready for the reception of further credit information. At the time that the transaction tape is loaded in the apparatus, switch 180 is shifted from its illustrated position applying a logical one to gate 182 into connection with line 184 thus applying a logical zero as one of the inputs to gate 182 on line 186.

The receipt of the second tone signal detected by filter 126 similarly produces a pulse which is applied to the input of flip flop 142 to cause it to shift back to its initial condition and apply a logical one to output line 200. This shift causes flip-flop 202 to shift its output condition and apply an operating signal to erase head 204 which is thereafter operative to remove information from the old tape before the new information is written thereon. Preferably erase head 204 is situated or otherwise disposed so that the Q marks on the tape are not removed by erase head 204. The logical one at the output of flip-flop 142 is also applied via switch 206 as the other input to gate 182 so that gate 182 shifts its logical output from logical zero to logical one thus shifting the output at one input to gate 156 which changes the output condition of gate 158 from logical zero to logical one. This in turn renders transistor 164 conductive, completes the current path through relay coil 166 and causes tape motor 171 to advance the tape. The tape thereafter advances until a further Q mark is detected by head 172, at which time gate 158 shifts its output condition back to logical zero and the up-dating process has been completed.

The credit information received by antenna 120 and converted by multiplexer 124 into a suitable form for recording on magnetic tape is applied to two individual write heads. The signals at the output of multiplexer 124 are amplified by transistor 220 and applied as one of the inputs to NOR gate 224. The output of gate 224 is then applied as one of the inputs to gate 226. The other input to gate 226, as well as corresponding gate 228, is the output of tone filter 126, applied via diode 130 and inverter 132. Thus, while a tone is being received, a logical one is applied to line 230 as one of the two inputs to gates 226 and 228 so that these gates are disabled and the tones received are not written on the heads. The output of gate 226 is applied to gates 240 and 242 which in turn apply signals to head 212 via inverter 244 and transistor 246. Similarly, the output of gate 228 is applied to head 210 via gates 245 and 247, inverter 248 and transistor 250.

It is desirable to employ non-working hours for credit information transmission to prevent disruption of a credit transaction, and since these hours are normally in the early morning when it is not practical or desirable to have personnel present at the credit station, provision is made in the arrangement shown in FIG. 3 for automatically responding to up-dating information without the intervention of personnel. Thus, at the end of the day or when everyone at the credit station leaves, the transaction tape can be loaded in the appropriate location and switch 180 shifted in connection with line 184. At the same time switch 206 can also be shifted into connection with line 184 so that both the inputs to gate 182 are logical zeros thus applying a logical one as one of the inputs to gate 156 which causes switch 160 to be closed in the same manner described above, and the tape to advance to the position where the Q mark is detected by head 166. The first tone detected by filter 126, which shifts flip-flop 142, then has no effect since the output on line 200 is not passed by switch 206 as an input to gate 182. The system responds normally to the second tone produced causing the tape to advance and information to be written on the tape by heads 210 and 212 as described above.

Figure 5:
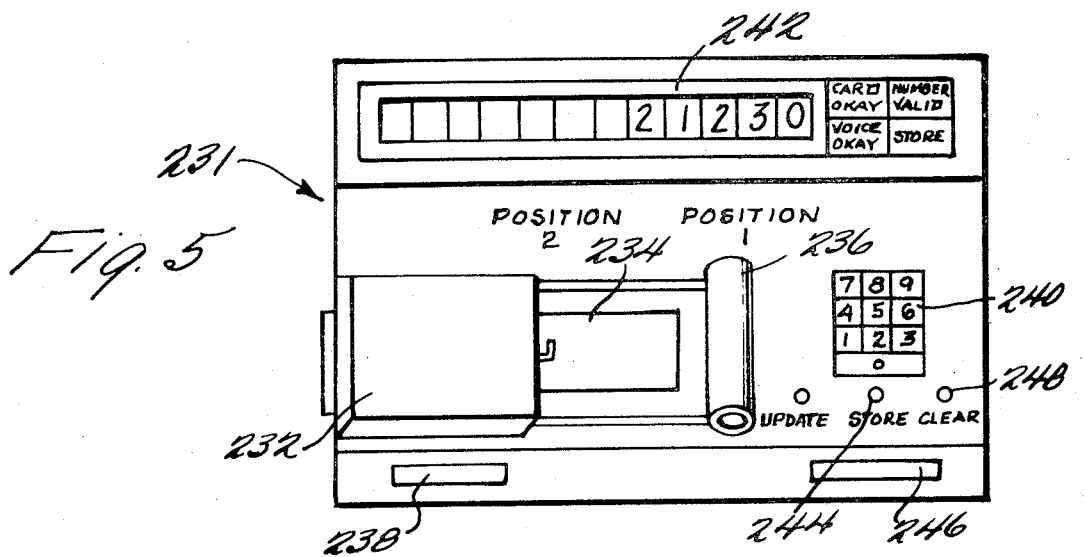
FIG. 5 shows a top view of an apparatus for use at each credit station for checking the validity of the credit card and recording information.
Figure 6:
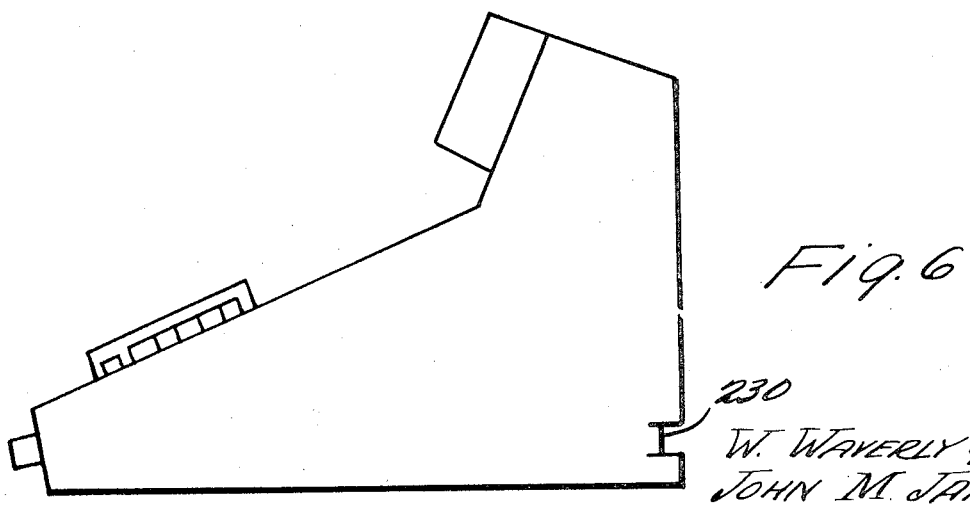
FIG. 6 shows a side view of the apparatus of FIG. 5.
Figure 4:
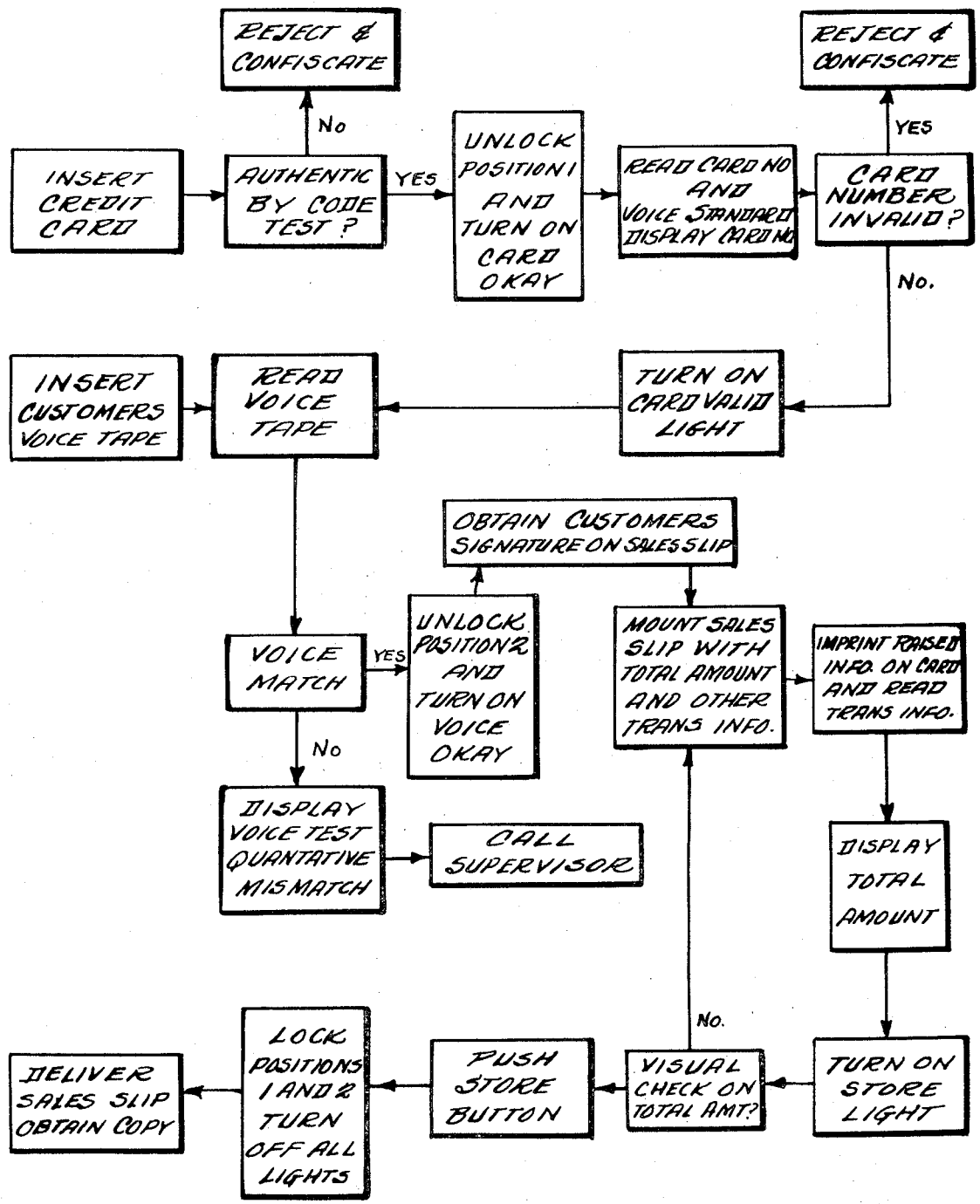
FIG. 4 shows a flow diagram for checking a credit card at a credit station and subsequently recording a transaction.

Reference is now made to FIG. 4 which shows a flow diagram of the process which is preferably employed at each credit station with apparatus such as shown in FIGS. 5 and 6 for determining the status of a credit card from a transaction tape which is periodically updated in the manner described above, and for recording the credit transaction. As mentioned above, the credit card which is employed in this arrangement preferably has coded thereon or therein, for example, by magnetic ink, credit information, preferably the identification number of the card. One suitable way for encoding such information is described and discussed further in an application by Eberly et al. entitled "Document Authentication Method and Apparatus" filed Feb. 3, 1972, Ser. No. 223,079 the disclosure of which is fully incorporated herein explicitly by reference.

As can be seen in FIG. 6, the credit transaction tape has been previously inserted into the device at the rear thereof at a location 230, where it is disposed adjacent suitable heads for reading the information on the tape and cooperates with suitable playback arrangement for advancing the tape preferably automatically when a credit card is inserted into the authenticating unit 231 shown in FIG. 5. This authenticating unit further includes suitable circuitry for reading the hidden information on the card, for example, the magnetic ink, and deriving signals which can be compared with the identifying signals derived from the tape inserted at location 232. If there is a match, then the card inserted is on the list of stolen, lost or misused cards, and a suitable indication thereof is given to the individual operating the device. An invalid light can be provided on the console for this purpose. In the arrangement shown in FIG. 5, if there is no match, a square labelled "card OK" is lit and if there is a match, it is not lit indicating that the credit transaction is not approved. If there is no match, the card preferably advances automatically to a further location 234 where a sales slip can be placed over it and a printer bar 236 rolled over the card to conventionally print embossed information on the sales slip. If the card number matches a number on the list, the card does not advance and accordingly the transaction cannot proceed further.

To provide a further security test for the system, the console illustrated in FIGS. 5 and 6 is also preferably capable of checking the voice pattern of the individual presenting the card against a voice pattern which is encoded onto the card itself, for example, digitally in magnetic ink. The customer presenting the card pronounces a coded word or phrase and this is recorded by the operator of the console on a suitable casette whose location is indicated on the console at 238. The signals derived from this recording are compared with the signals derived from the card representing the voice pattern of the holder of the card, and if there is a match within a certain range, a light behind the square indicated VOICE OK on the console is illuminated. The extent of quantitative voice mis-match which will be acceptable is set by the local manager or supervisor based on the acceptable level of customer insults and stole credit cards which will match. If the mis-match is outside the limits, the value of the mis-match is also preferably displayed so that a decision can be made as to whether to override and approve the transaction.

If the cards are determined to be OK and the voice matches, the operator mounts the sales slip and it prints the embossed information on the card on the slip. At this time, the operator also manually enters into the keys 240 information regarding the transaction, particularly its amount and any other information such as the number of the credit card. This information is displayed on display 242, which may be of any suitable type. The operator can then quickly and simply check correlation between the displayed information on display 42 and the information on the sales slip. IF this information correlates, a store button 244 is depressed at which time the information entered on manual keys 240 and displayed at display 244 is written onto a third transaction magnetic tape indicated at 246. Operation of store button 244 also operates to clear keys 240 and display 242. Clear button 248 can be operated by the supervisor in the event of an unacceptable test at any stage if, in the opinion of the operator, the transaction should be approved.

On completion of the transaction a completed sales slip is given to the customer, and a copy retained for audit purposes. Transaction information recorded on the magnetic tape cassette at 246 is recovered automatically by a central reader and format machine which prepares the accounting information in a form compatible with other phases of the billing inventory control operation. These tapes are indicated in the flow diagram of FIG. 4.

Many changes and modifications in the above embodiments of the invention can, of course, be made without departing from the scope of the invention. Accordingly, that scope is intended to be limited only by the scope of the appended claims.

What is claimed is:
1. A credit system comprising:
a plurality of separated credit stations each having storage means for containing and storing credit information on a plurality of different individuals, means for interrogating said storage means and means for receiving radio waves having updating credit information and replacing the information in said storage means with said updating information on a plurality of individuals
a central station physically remote from said credit stations for periodically transmitting to said plurality of separated credit stations said radio waves having updating information,
means for deriving information from a presented credit card and comparing that credit information in said storage means,
means for deriving signals from said card representing the voice pattern of the card holder, and
means for receiving a spoken audio signal and producing a voice pattern from that signal and means for comparing the two voice patterns.
2. A system as in claim 1 wherein said radio waves are frequency modulated and said central station includes means for further transmitting frequency modulated radio waves not having updating information and means for switching from said further transmitting means to said periodically transmitting means and from said periodically transmitting means to said further transmitting means.
3. A system as in claim 1 wherein said transmitting means includes manually operable switch means, means for transmitting a coded tone signal for a short interval upon operation of said switch means, and means for beginning transmission of said radio waves having updating information after a given time delay following operation of said switch means.
4. A system as in claim 3 wherein said central station transmitting means includes means for playing a magnetic tape, means for converting information on said magnetic tape into said radio waves having updating information and means for causing said playing means to play said tape, until a predetermined signal is derived from said tape, upon operation of said switch means and wherein said beginning transmission means includes means for again causing said playing means to play said tape at the end of said given time delay.
5. A system as in claim 4 wherein said tone transmitting means includes a tone generator, a differentiating circuit connected to said tone generator and to said switch means so that operation of said switch means causes a pulse to be applied to said differtiating circuit which applies a short pulse to said tone generator which produces said coded tone signal.
6. A system as in claim 5 further including a second differentiating circuit connected to said tone generator, and logic means connecting said switch means to said differentiating circuits, which shifts from a first condition upon operation of said manual switch means to a second condition, producing a pulse which is applied to one of said differentiating circuits, to cause said tone generator to produce a coded tone signal and which thereafter, after said given time delay, shifts back to said first condition, producing a pulse which is applied to the other one of said differentiating circuits, to cause said tone generator to produce a second coded tone signal.

7. A system as in claim 6 wherein said logic means includes a first NOR gate having a first input connected to said switch means and an output connected to one of said differentiating circuits, a second NOR gate having a first input connected to the output of said first gate and an output connected to the other one of said differentiating circuits connected to a second input to said first gate, an integrating circuit having an input connected to the output of said second gate and having an output, and circuit means having an input connected to the output of said integrating circuit and an output which shifts from a first to second condition when the output of said integrating circuit reaches a given level which said output of said circuit means connected to a second input to said second gate.

8. A system as in claim 6 wherein said beginning transmission means includes logic means connected to said differentiating circuits.

9. A system as in claim 6 wherein said storage means is a further magnetic tape.

10. A system as in claim 9 wherein said receiving and replacing means includes station logic means responsive to receipt of the first of said coded tone signals for producing a first signal and a light connected to said first signal for lighting and giving an update emmient warning upon production of said first signal.

11. A system as in claim 9 wherein said receiving and replacing means includes means for preventing said coded tone signals from being placed on said further tape.

12. A system as in claim 9 wherein said receiving and replacing means includes means for causing said further tape to move upon receipt of the first coded signal until a given information signal is derived from said further tape and to thereafter resume causing said further tape to move after receipt of the second coded tone signal to replace said information on said further tape and means for deriving said given signal from said further tape.

13. A system as in claim 12 wherein said receiving and replacing means includes means for erasing said further tape.

14. A system as in claim 1 including means for displaying the results of the comparison.

15. A system as in claim 1 wherein each said credit station further includes means for manually entering transaction information, means for displaying said transaction information, means for storing said transaction information on a magnetic tape, and manually operable means for causing said storing means to store said transaction information.

16. A system as in claim 16 wherein said transaction information storing means stores said transaction information at a plurality of locations.

17. A credit station for checking the validity of a presented credit card comprising:
storage means for containing credit information,
means for deriving information from a presented credit card,
means for comparing derived information with said credit information in said storage means,
means for manually entering transaction information,
means for displaying said transaction information,
means for storing said transaction information
manually operable means for causing said storing means to store said transaction information, and
means for deriving signals from said card representing the voice pattern of the card holder means for receiving a spoken audible signal and producing a voice pattern from that signal and means for comparing the two voice patterns.

18. A station as in claim 17 including means for displaying the results of the comparison.

19. A station as in claim 17 wherein said transaction information storing means stores said transaction information at a plurality of locations.

* * * * *